United States Patent
Li et al.

(10) Patent No.: US 11,964,855 B2
(45) Date of Patent: *Apr. 23, 2024

(54) REINFORCED REMOVABLE PLUGGABLE MODULE PULL TABS

(71) Applicant: Cisco Technology, Inc., San Jose, CA (US)

(72) Inventors: Li Li, San Ramon, CA (US); Matthew Los, South San Francisco, CA (US); Joyce Peternel, Morgan Hill, CA (US); Stephan Gostonyi, Allentown, PA (US); Fred Warning, Mertztown, PA (US); Mittu Pannala, Breinigsville, PA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/520,284

(22) Filed: Nov. 5, 2021

(65) Prior Publication Data

US 2022/0055879 A1 Feb. 24, 2022

Related U.S. Application Data

(63) Continuation of application No. 17/015,693, filed on Sep. 9, 2020, now Pat. No. 11,242,234.

(Continued)

(51) Int. Cl.
*H01R 13/62* (2006.01)
*B66F 19/00* (2006.01)
(Continued)

(52) U.S. Cl.
CPC .............. *B66F 19/00* (2013.01); *G06F 1/187* (2013.01); *H01R 13/62* (2013.01); *H01R 13/6335* (2013.01)

(58) Field of Classification Search
CPC ......... B66F 19/00; G06F 1/187; H01R 13/62; H01R 13/633
See application file for complete search history.

(56) References Cited

U.S. PATENT DOCUMENTS

| 3,444,967 A | * | 5/1969 | Lautin | .................... A45C 13/26 |
| | | | | D8/316 |
| 4,036,273 A | | 7/1977 | Kemper | |

(Continued)

FOREIGN PATENT DOCUMENTS

| CN | 209148908 U | 7/2019 |
| CN | 110764198 A1 | 2/2020 |

OTHER PUBLICATIONS

"Extrusion Metal Inserts," Lusida Rubber Products, https://lusidarubber.com/prodcuts/extrusion-metal-inserts/, retrieved Oct. 29, 2021, 2 pages.

(Continued)

*Primary Examiner* — Truc T Nguyen
(74) *Attorney, Agent, or Firm* — Edell, Shapiro & Finnan, LLC

(57) ABSTRACT

Presented herein are removable pull tabs that are configured to be detachably coupled to pluggable modules in a manner that facilitates removal of the pull tabs from the module without disassembling the modules. In particular, a removable pull tab may comprise a handle, first and second substantially parallel attachment arms extending from the handle, and a reinforcement line embedded in the handle and first and second attachment arms. The first and second attachment arms comprise first and second attachment mechanisms, respectively, disposed at a distal end of the respective attachment arm. The first and second attachment mechanisms are configured to detachably couple to first and second apertures, respectively, of a pluggable module.

20 Claims, 13 Drawing Sheets

Related U.S. Application Data

(60) Provisional application No. 62/956,355, filed on Jan. 2, 2020.

(51) Int. Cl.
*G06F 1/18* (2006.01)
*H01R 13/633* (2006.01)

(56) References Cited

U.S. PATENT DOCUMENTS

| | | | |
|---|---|---|---|
| 4,368,378 A | 1/1983 | Jacobs | |
| 5,368,498 A | 11/1994 | Matsuoka et al. | |
| 5,690,508 A * | 11/1997 | Atkinson | H01R 13/6335 |
| | | | 439/484 |
| 6,464,514 B1 | 10/2002 | Tsa et al. | |
| 6,648,666 B1 * | 11/2003 | Wu | H01R 13/6335 |
| | | | 439/352 |
| 6,746,158 B2 | 8/2004 | Merrick | |
| 6,885,560 B2 | 4/2005 | Zaremba | |
| 8,816,222 B2 | 8/2014 | Pimentel | |
| 9,175,705 B1 | 11/2015 | Clark, Jr. et al. | |
| 9,430,004 B2 | 8/2016 | Meadowcraft | |
| 9,523,826 B2 | 12/2016 | Tsai et al. | |
| 9,541,719 B2 | 1/2017 | Ishii et al. | |
| 9,929,500 B1 | 3/2018 | Ista | |
| 2002/0053278 A1 * | 5/2002 | Hayes | G02B 6/4465 |
| | | | 89/1.34 |
| 2005/0026484 A1 | 2/2005 | Demuth | |
| 2005/0013548 A1 | 7/2005 | Chiu et al. | |
| 2008/0031577 A1 | 2/2008 | Walker et al. | |
| 2010/0248522 A1 | 9/2010 | Crofoot et al. | |
| 2012/0302078 A1 | 11/2012 | Yang | |
| 2015/0092327 A1 * | 4/2015 | Meadowcroft | G06F 1/183 |
| | | | 254/133 R |
| 2015/0263453 A1 | 9/2015 | Wang et al. | |
| 2016/0054527 A1 | 2/2016 | Tang et al. | |
| 2016/0341913 A1 * | 11/2016 | Wang | G02B 6/4261 |
| 2022/0399680 A1 * | 12/2022 | Mizutani | H01R 13/707 |
| 2023/0015510 A1 * | 1/2023 | Kao | H01R 13/533 |
| 2023/0016443 A1 * | 1/2023 | Sun | H01R 13/6275 |

OTHER PUBLICATIONS

"Timing Belt," Lusida Rubber Products, https://lusidarubber.com/products/synchronous-teeth-belt, retrieved Oct. 29, 2021, 8 pages.

* cited by examiner

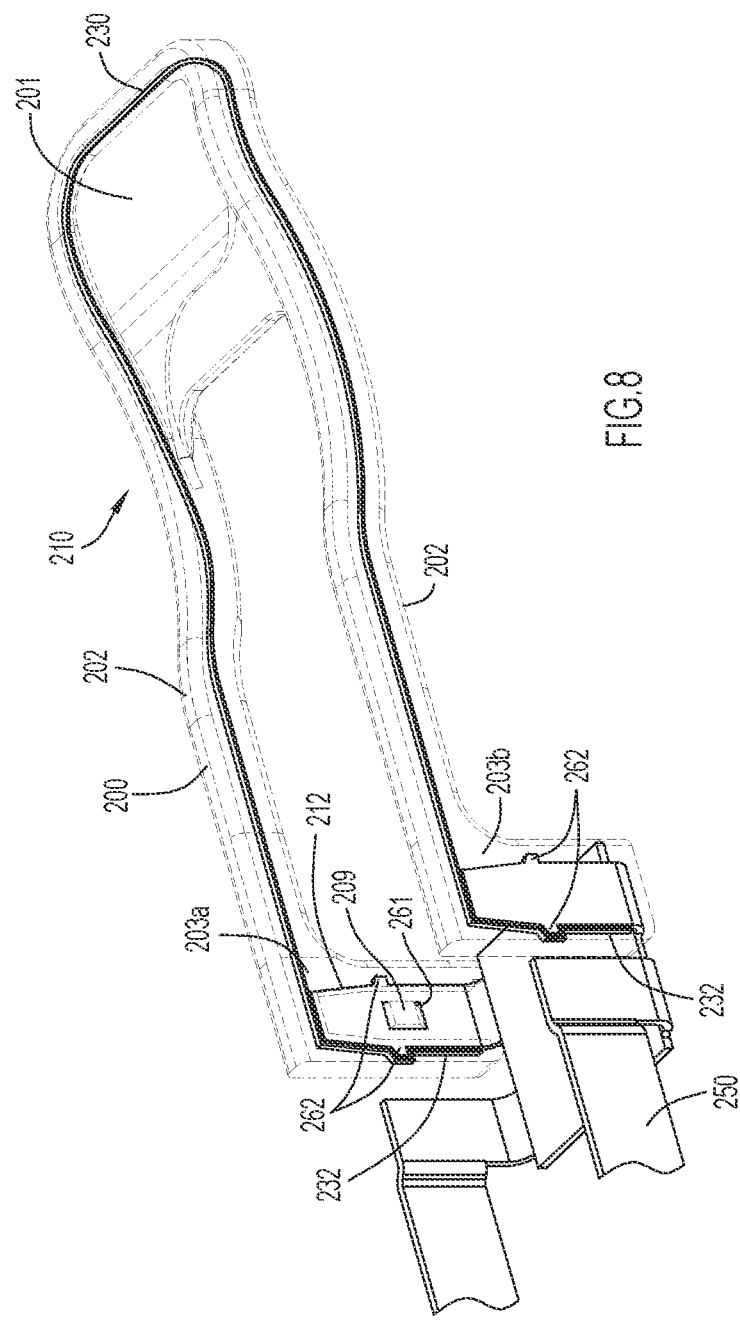

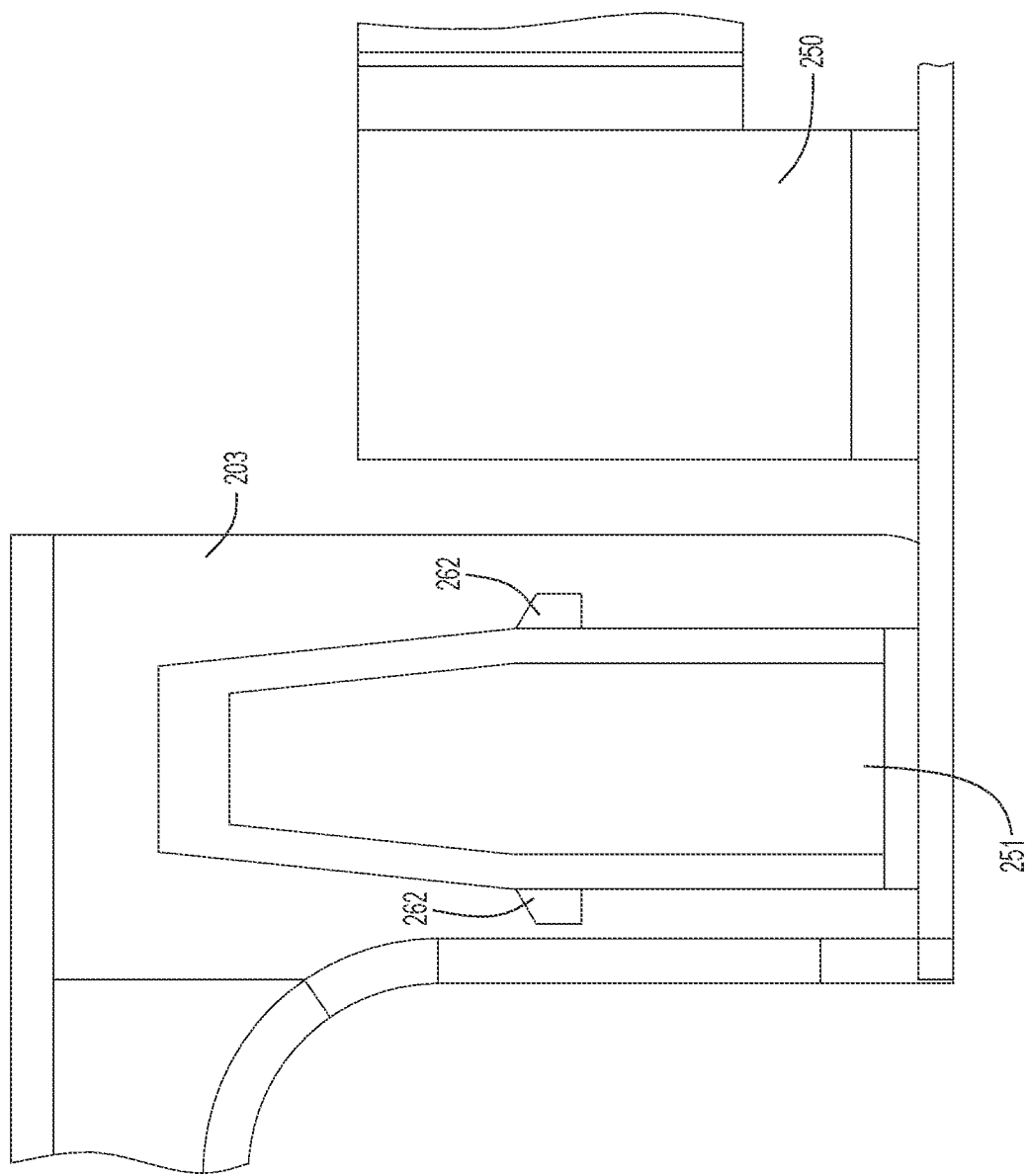

REINFORCED REMOVABLE PLUGGABLE MODULE PULL TABS

CROSS REFERENCE TO RELATED APPLICATIONS

This application is a continuation of U.S. application Ser. No. 17/015,693, filed Sep. 9, 2020, which claims priority to U.S. Provisional Application No. 62/956,355, filed Jan. 2, 2020. The entirety of these applications are incorporated herein by reference.

TECHNICAL FIELD

The present disclosure relates to reinforced, removable pull tabs for pluggable modules.

BACKGROUND

The sheer scale and size of large data centers, high-performance computing networks, and other systems can make the management of the equipment in those systems cumbersome. As such, some equipment may include visual aids/indicators or other identifying characteristics, such as logos, labels, etc., that ease the management burden of the equipment. For example, certain equipment may have a modular form that enables the equipment to be "plugged" into, and removed from, a slot in, for example, a rack/cage. These equipment modules, sometimes referred to as "pluggable modules," may include a "pull tab" or "pull handle" having a particular appearance so that a technician can readily identify that the module is associated with, for example, a particular customer, wavelength, function, etc. However, when pluggable modules are reassigned to other purposes, it can be difficult, costly, and/or time-consuming to update the visual indicators of the items to properly reflect their reassignment.

BRIEF DESCRIPTION OF THE DRAWINGS

FIG. 8 is a diagram depicting an isometric view of a slide of a pluggable module and a pull tab with interior details shown, in accordance with an example embodiment.

FIG. 9B is a diagram depicting a side view of a slide of a pluggable module and a pull tab, in accordance with an example embodiment.

DESCRIPTION OF EXAMPLE EMBODIMENTS

Overview

Figure 1:
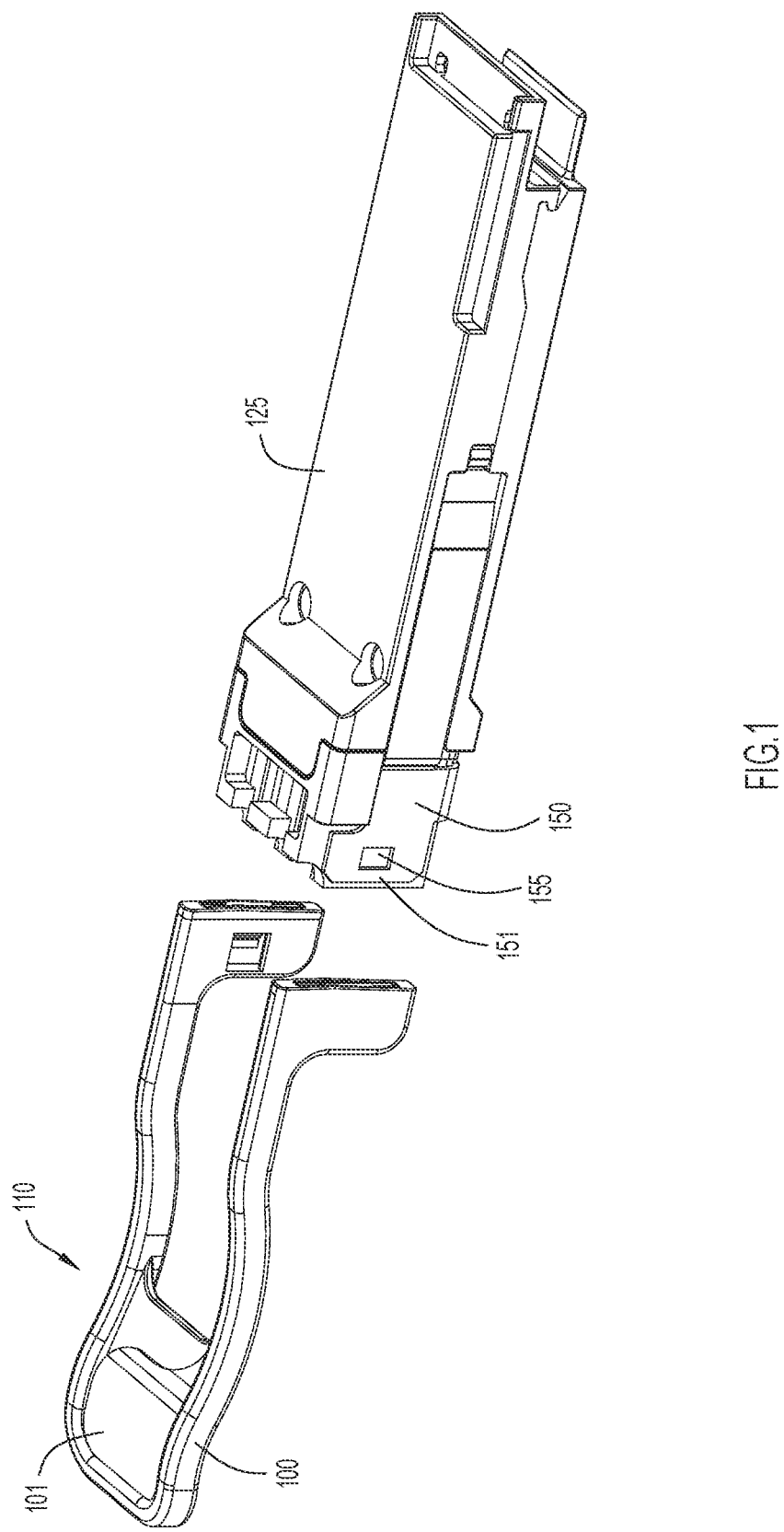
FIG. 1 is a diagram depicting an isometric view of a pluggable module and pull tab, in accordance with an example embodiment.

Presented herein are reinforced, removable pull tabs that are configured to be detachably coupled to pluggable modules in a manner that facilitates removal of the pull tabs from the module without disassembling the modules. In particular, a removable pull tab may comprise a handle, first and second substantially parallel attachment arms extending from the handle, and a reinforcement line embedded in the pull tab. The first and second attachment arms comprise first and second attachment mechanisms, respectively, disposed at a distal end of the respective attachment arm. The first and second attachment mechanisms are configured to detachably couple to first and second apertures, respectively, of a pluggable module.

Example Embodiments

The present disclosure relates to a reinforced, removable pull tab for a pluggable module. A pull tab, also known as a pull handle or pull release, is used for inserting a pluggable module into and/or removing the pluggable module from a slot in, for example, a rack/cage. A pull tab may be used to provide a visual aid/indicator of, for example, a particular customer, wavelength, function, etc. associated with the corresponding pluggable module. That is, the pull tab may enable rapid identification of the pluggable module to which it is attached. Conventional pull tabs lack modularity and can only be removed from a pluggable module with considerable effort, namely partial disassembly of the pluggable module to which the pull tab is attached. The lack of modularity thus requires significant manual re-work upon reassignment of pluggable module, which introduces increased labor costs and can increase the risk of damaging the sensitive equipment. The lack of modularity in pull tabs also adds to supply-chain complexity.

Presented herein are reinforced, removable pull tabs for use with pluggable modules. The pull tabs presented herein, sometimes referred to herein as "removable pull tabs," have an arrangement that enables the removable pull tabs to be easily replaced or exchanged when, for example, a pluggable module has been reassigned to another customer or task in a manner that avoids having to manually disassemble the pluggable module. As such, the removable pull tab facilitates, for example, swapping/exchanging of a color-coded portion of a pull tab, which identifies features of a pluggable module, such as reach or customer specifics, without requiring disassembly of the pluggable module.

Moreover, a reinforced, removable pull tab in accordance with certain embodiments presented herein includes a locking mechanism that attaches a rubber or plastic portion handle portion of the pull tab to the pluggable module. When the pluggable module is in use (e.g., positioned in a slot), the locking mechanism is not exposed, therefore minimizing the chance that the pull tab could be accidentally removed. The locking mechanism can include a snap-fit, a sliding joint, a locking feature, and/or a surface friction, barb/hook feature. Additionally, the pull tabs presented herein include reinforcement lines configured to transfer a majority of a force applied to a handle of the tab to the pluggable module. Thus, the pulling force applied to the handle to remove the pluggable module from a rack/cage bypasses a body of the pull tab.

Embodiments are now described in detail with reference to several figures. It is to be appreciated that any depicted measurements or dimensions are merely illustrative and that pull tabs and transceiver modules in accordance with embodiments presented herein may have a number of different shapes, sizes, and/or arrangements. For purposes of illustration, the embodiments are primarily described below with reference to a particular type of pluggable module, namely a pluggable transceiver module (transceiver module). It is to be appreciated that specific reference to a transceiver module is merely illustrative and that embodiments presented herein may be used with other types of pluggable modules.

FIG. 1 is a diagram depicting an isometric view of a transceiver module 125 and a pull tab 100, in accordance with an example embodiment. As depicted, pull tab 100 is shown adjacent to, but detached from, the transceiver module 125. Transceiver module 125 may be a module assembled from multiple components that is configured to perform one or more functions (e.g., conversion of light signals to electrical signals). When in use, transceiver module 125 may be positioned in a slot of a rack/cage.

As described in further detail below, pull tab 100 and transceiver module 125 are configured for detachable mechanical coupling/attachment with one another. As used herein, "detachable mechanical coupling/attachment" means that pull tab 100 and transceiver module 125 can be physically mechanically connected to one another, or physically mechanically disconnected from one another, without the need to disassemble pull tab 100, slide 150, and/or transceiver module 125. For example, in certain embodiments, transceiver module 125 includes a slide 150 that provides one or more points of attachment for pull tab 100.

Slide 150 includes slide arms 151, and slide 150 and/or slide arms 151 may be formed from a rigid or semi-rigid material, such as aluminum or a similar material. Slide arms 151 each include an aperture 155 that, as described further below, facilitates attachment of pull tab 100 thereto.

Figure 2:
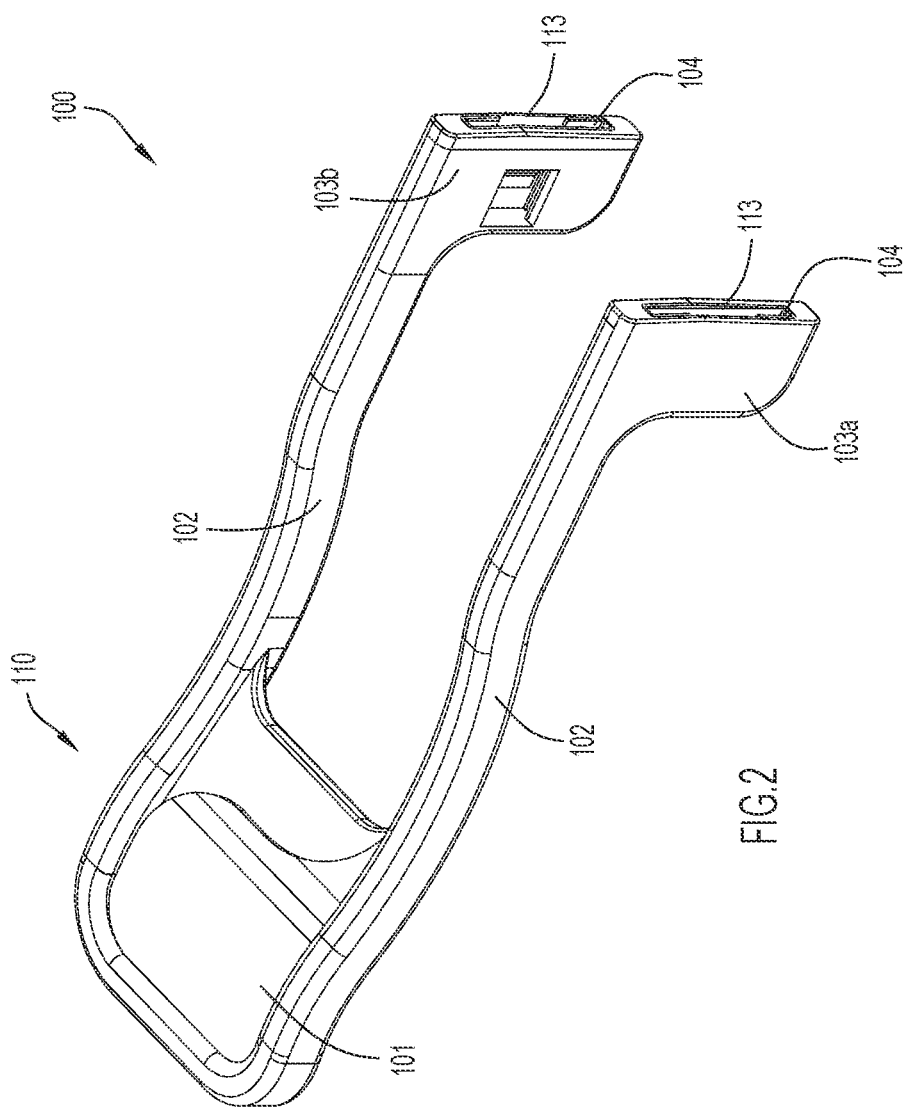
FIG. 2 is a diagram depicting an isometric view of a pull tab, in accordance with an example embodiment.
Figure 3:
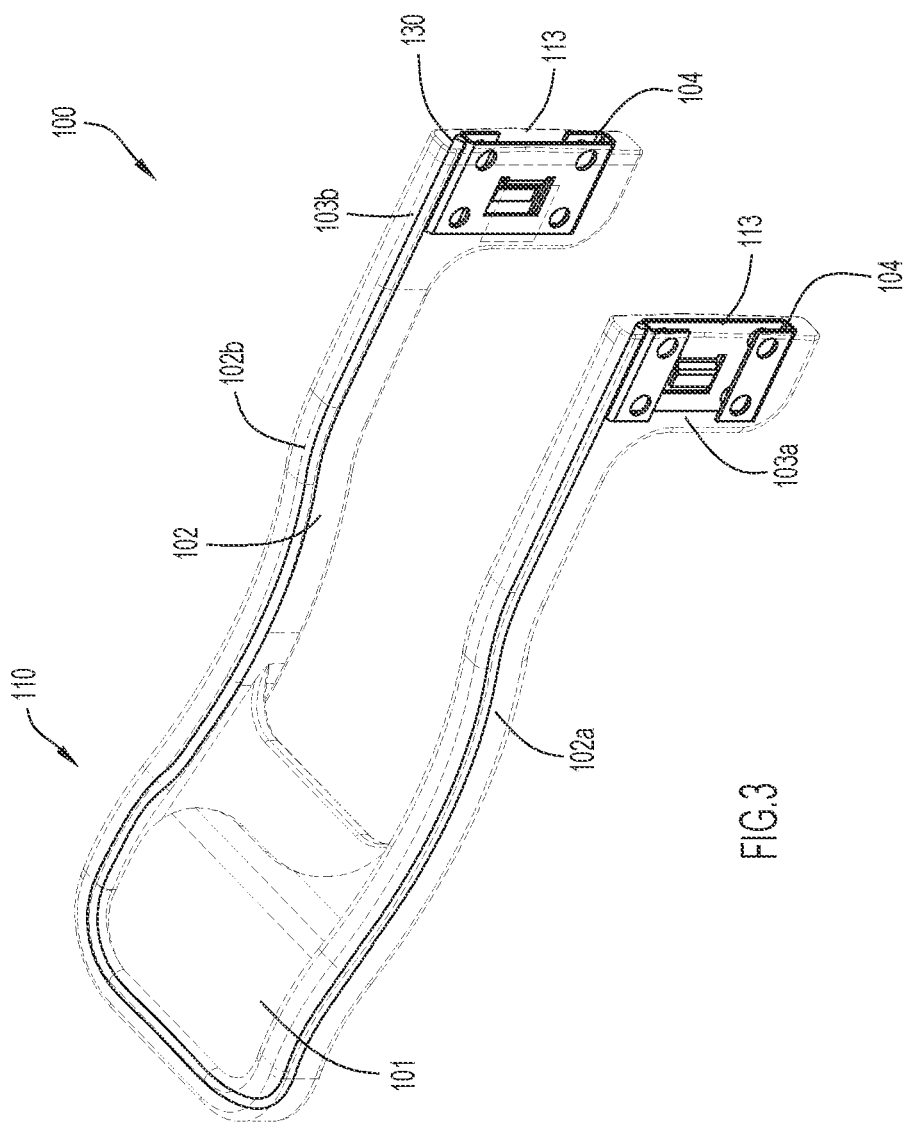
FIG. 3 is a diagram depicting an isometric view of a pull tab with interior details shown, in accordance with an example embodiment.

FIG. 2 is a diagram depicting an isometric view of the pull tab 100, in accordance with an example embodiment, while FIG. 3 is a diagram depicting an isometric view of a pull tab 100 with interior details shown. As depicted in FIGS. 2 and 3, pull tab 100 includes a handle 101, two attachment arms 102 that include a first attachment (distal) end 103a, a second attachment (distal) end 103b, and a reinforcement line 130 extending from the first attachment end 103a through first attachment arm 102a, pull handle 101, second attachment arm 102b to the second attachment end 103b. In certain embodiments, the handle 101 and attachment arms 102 (including attachment ends 103a, 103b) of pull tab 100 collectively form a "body" 110 of the pull tab 100. The body 110 is generally formed from a resiliently flexible material (e.g., a material possessing a degree of flexibility). For example, the body such as a plastic material, thermoplastic vulcanizates (TPV) or other thermoplastic elastomer (TPE), a rubber material, and the like. In some embodiments, pull tab 100 includes a portion formed from Santoprene™. Santoprene™ is a trademark of Exxon Mobile. In certain embodiments, the reinforcement line 130 may be a wire, a strip, or a cable embedded in the body 110 of the pull tab 100. In certain embodiments, the reinforcement line 130 material may include a metal (e.g., steel, aluminum, brass, copper, etc.), a non-metallic material, and/or a polymer, e.g., Nylon, Kevlar, Nomex, Vectran, zylon, polypropylene, polyethylene, polyvinyl chloride, etc.) The size, shape, and material of the reinforcement line 130 may be selected to avoid, or reduce, electromagnetic interference and conform to the material characteristics (e.g., flexibility) of the pull tab body 110.

In certain embodiments, the reinforcement line 130 may include two reinforcement lines embedded in the pull tab 100. Each reinforcement line extending from an attachment end 103a, 103b to the handle 101. The two reinforcement lines may be coupled to each other at the handle 101 or separated from one another by the material of the pull tab handle 101.

As shown, each attachment end 103a, 103b includes an attachment mechanism 104 for attaching the attachment end 103a, 103b to slide 150 of transceiver module 125. As described further below, each attachment mechanism 104 may be formed from a rigid or semi-rigid material and is configured for attachment to the transceiver module 125. As shown in FIGS. 2 and 3, the attachment ends 103a, 103b each include an opening 113 that facilitates attachment of the attachment mechanisms 104 to the slide 150 (FIG. 1) of transceiver module 125. The reinforcement line 130 is coupled to the attachment mechanisms 104. For example, the coupling between the reinforcement line 130 and the attachment mechanisms 104 may be achieved through an interference fit, soldering, chemical bonding, welding, an adhesive etc. In certain embodiments the attachment mechanisms 104 and reinforcement line 130 may be formed as a unitary structure. In certain embodiments, the material of each attachment end 103a, 103b of pull tab 100 is molded around a respective attachment mechanisms 104 and reinforcement line 130. In some embodiments, the material of attachment ends 103a, 103b is a flexible or semi-flexible material, and the attachment mechanisms 104 are rigid or semi-rigid.

In operation, and with reference to FIGS. 1 and 3, a pulling force applied to the handle 101 to remove the transceiver module 125 from a rack/cage is transmitted through the reinforcement line 130 to the attachment mechanisms 104 at the attachment ends 103a, 103b to the slide 150. Thus, the pulling force applied to the handle 101 to remove the transceiver module 125 from a rack/cage bypasses the body 110 and attachment ends 103a, 103b.

Figure 4:
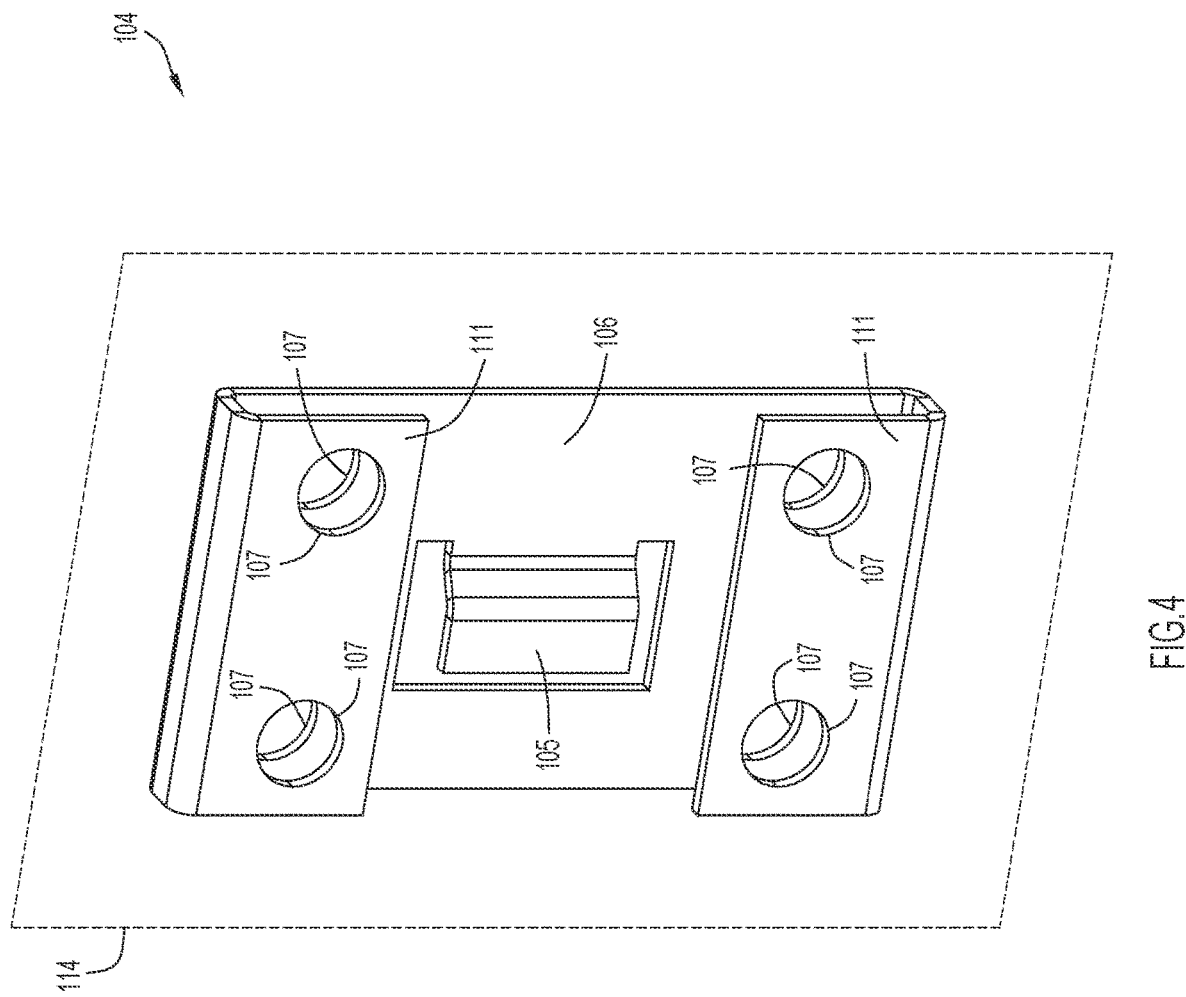
FIG. 4 is a diagram depicting an attachment mechanism of a pull tab, in accordance with an example embodiment.

FIG. 4 is a diagram depicting one embodiment of attachment mechanism 104 of pull tab 100, shown separate from body 110 in accordance with an example embodiment. As depicted, attachment mechanism 104 includes a hook 105, a body 106, body extensions 111, and openings 107. Attachment mechanism 104 may be composed of a metal or similar material, such as beryllium copper, stainless steel, and the like. Body 106 is generally disposed in a plane 114, and body extensions 111 may include planar sections that are substantially parallel to, but spaced from, plane 114 of body 106.

Pull tab 100 may be molded around attachment mechanisms 104. In certain embodiments, openings 107 may be provided in attachment mechanism 104 to enable the material of the attachment ends 103a, 103b to pass there through during the molding process, thereby ensuring that attachment mechanisms 104 are integrated with, and thereby retained within, attachment ends 103a, 103b. Openings 107 may be provided in body 106 and/or body extensions 111 to facilitate integration of the attachment mechanisms 104 with the attachment ends 103a, 103b during the molding process. The reinforcement line 130 prevents detachment between the attachment mechanisms 104 and the attachment ends 103a, 103b by reducing a load transmitted between the attachment mechanisms 104 and the attachment ends 103a, 103b. Force applied to the body 110 is transmitted through the reinforcement line 130 to the attachment mechanisms 104 via the coupling between the reinforcement line 130 and the attachment mechanisms 104. Thus, a majority of the force applied to the body 110 is transmitted through the reinforcement line 130 and not through the attachment ends 103a, 103b. Accordingly, the life of the pull tab 100 may be extended by inclusion of the reinforcement line 130.

Figure 5:
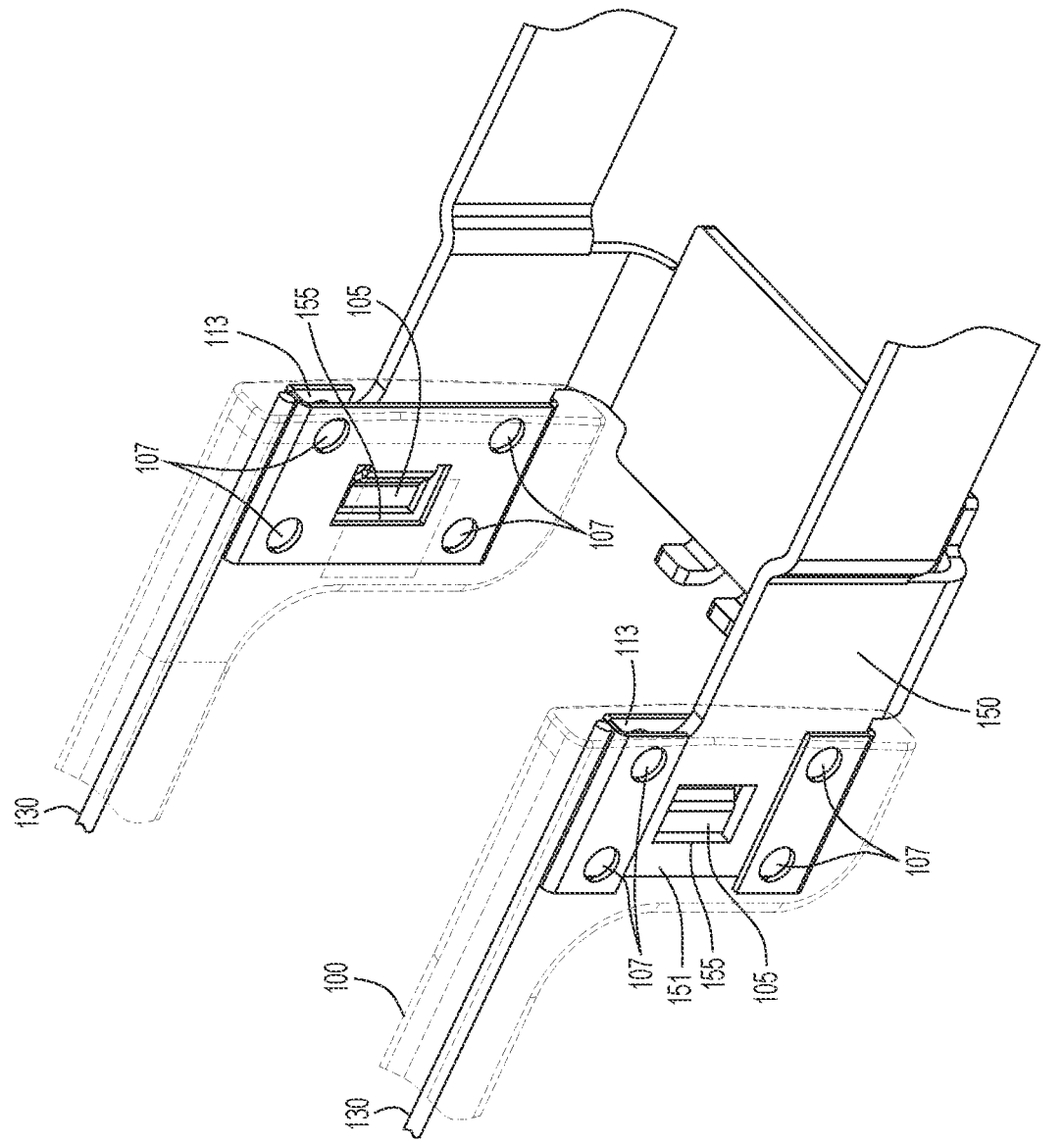
FIG. 5 is a diagram depicting view of a pull tab and a slide of a pluggable module with interior details shown, in accordance with an example embodiment.

Hook 105 is a semi-flexible projection that enables attachment and de-attachment of pull tab 100 from a slide 150 of a transceiver module 125 (shown in FIGS. 1 and 5). More specifically, hook 105 may include one or more angled or curved sections extending away from plane 114 of body 106. In general, hook 105 is configured to flex in a direction that is generally transverse to plane 114 of body 106 (i.e., flex towards and away from plane 114). However, hook 105 is resiliently biased (spring-biased away from plane 114) to a first configuration/position (shown in FIG. 4) when hook 105 is not being subjected to a force that depresses hook 105 toward the plane of body 106. That is, the material of hook 105 may possess a degree of elasticity that causes hook 105 to return to a position in which hook 105 is not substantially coplanar with the plane of body 106 when hook 105 is not being subjected to a force that depresses hook 105 toward the plane of body 106.

FIG. 5 is a diagram illustrating pull tab 100 mechanically coupled/attached to slide 150 of transceiver module 125. It should be appreciated that, for purposes of illustration, the body 110 of pull tab 100 is shown in FIG. 5 as being substantially transparent (opaque) so as to illustrate the details of attachment mechanisms 104 and the attachment with slides 150. Additionally, also for ease of illustration, the transceiver module 125 is omitted from FIG. 5.

In operation, pull tab 100 is attached to transceiver module 125 by first inserting slide arms 151 into openings 113. When slide arms 151 enter openings 113, hooks 105 initially contact slide arms 151 and hooks 105 are depressed (forced to flex towards plane 114 of body). As noted, slide arms 151 include apertures 155. As slide arms 151 are advanced into the openings 113, hooks 105 will eventually become aligned with apertures 155. When hooks 105 become aligned with apertures 155, the spring bias of hooks 105 cause hooks 105 to return (spring back) to the first configuration (e.g., hooks 105 return to the first configuration that is not substantially coplanar with plane 114 of body 106, as shown in FIG. 4) and thereby enter apertures 155. When hooks 105 enter apertures 155, slide arms 151 (slide 150) are locked within body 110. That is, hooks 105 and apertures 155 cooperate to prevent longitudinal movement of slide arms 151 relative to pull tab 100, absent application of an external force.

Figure 6A:
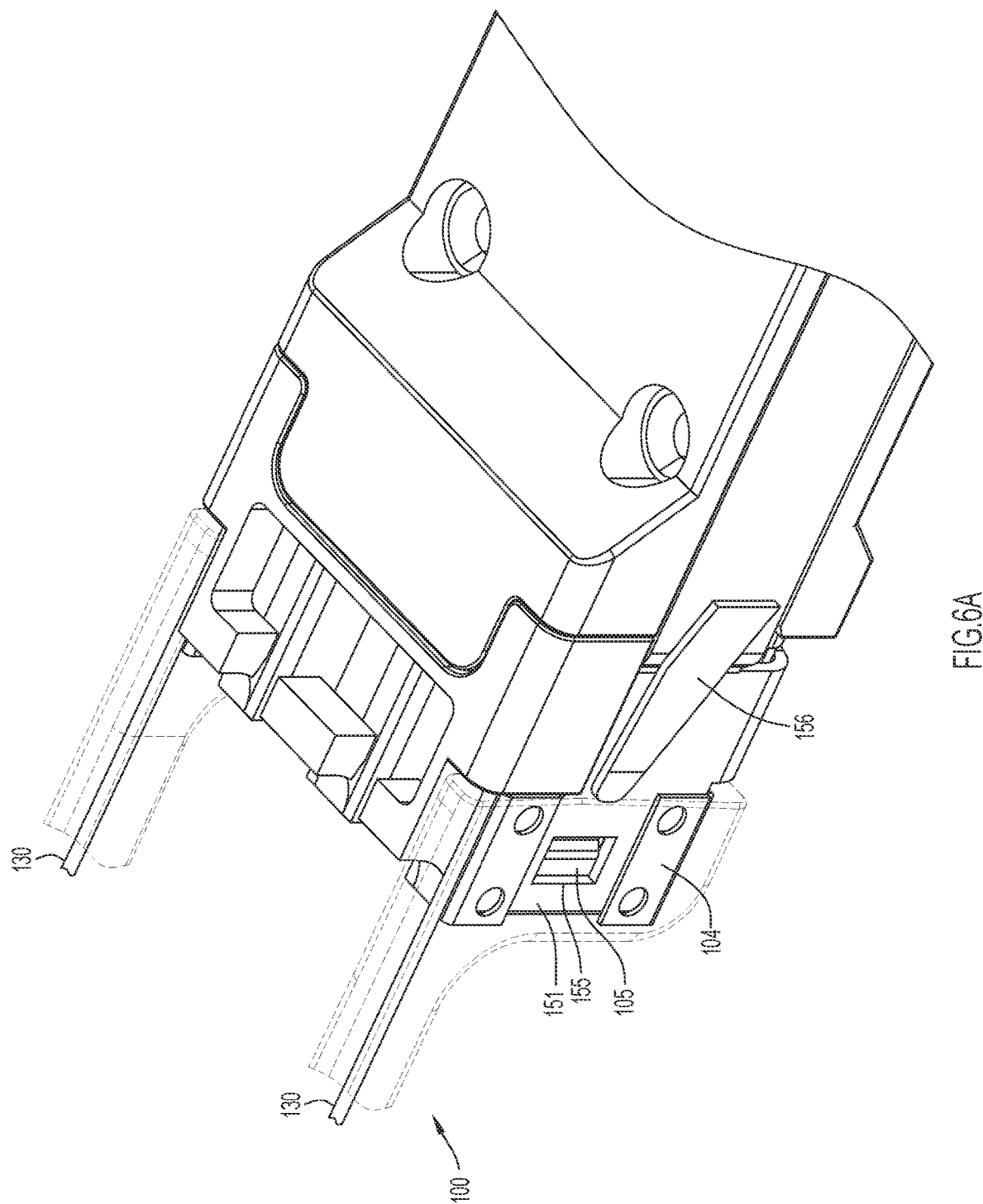
FIG. 6A is a diagram depicting removal of a pull tab with a removal tool, in accordance with an example embodiment.

FIG. 6A is a diagram depicting removal of pull tab 100 with a removal tool 156, in accordance with an example embodiment. Again, for purposes of illustration, the body 110 of pull tab 100 is shown in FIG. 6A as being substantially transparent (opaque) so as to illustrate the details of attachment mechanisms 104 and the detachment from slide 150. More specifically, in the example of FIG. 6A, a removal tool 156 is configured to slide into an opening 113 between the material of pull tab 100 and a slide arm 151 in order to depress hook 105 so that hook 105 disengages from aperture 155. When a hook 105 is depressed in this manner, the corresponding slide arm 151 can move longitudinally relative to pull tab 100. As such, the corresponding slide arm 151 may be removed from pull tab 100 (from opening 113) by applying a force to pull tab 100 that places attachment arms 102 in tension, thus pulling pull tab 100 away from transceiver module 125.

FIG. 6A illustrates the detachment of one slide arm 151 from one attachment mechanism 104. It is to be appreciated that substantially the same process may be performed each of the slide arms and corresponding attachment mechanisms (e.g., with reference to both of the first and second attachment arms 102).

Figure 6B:
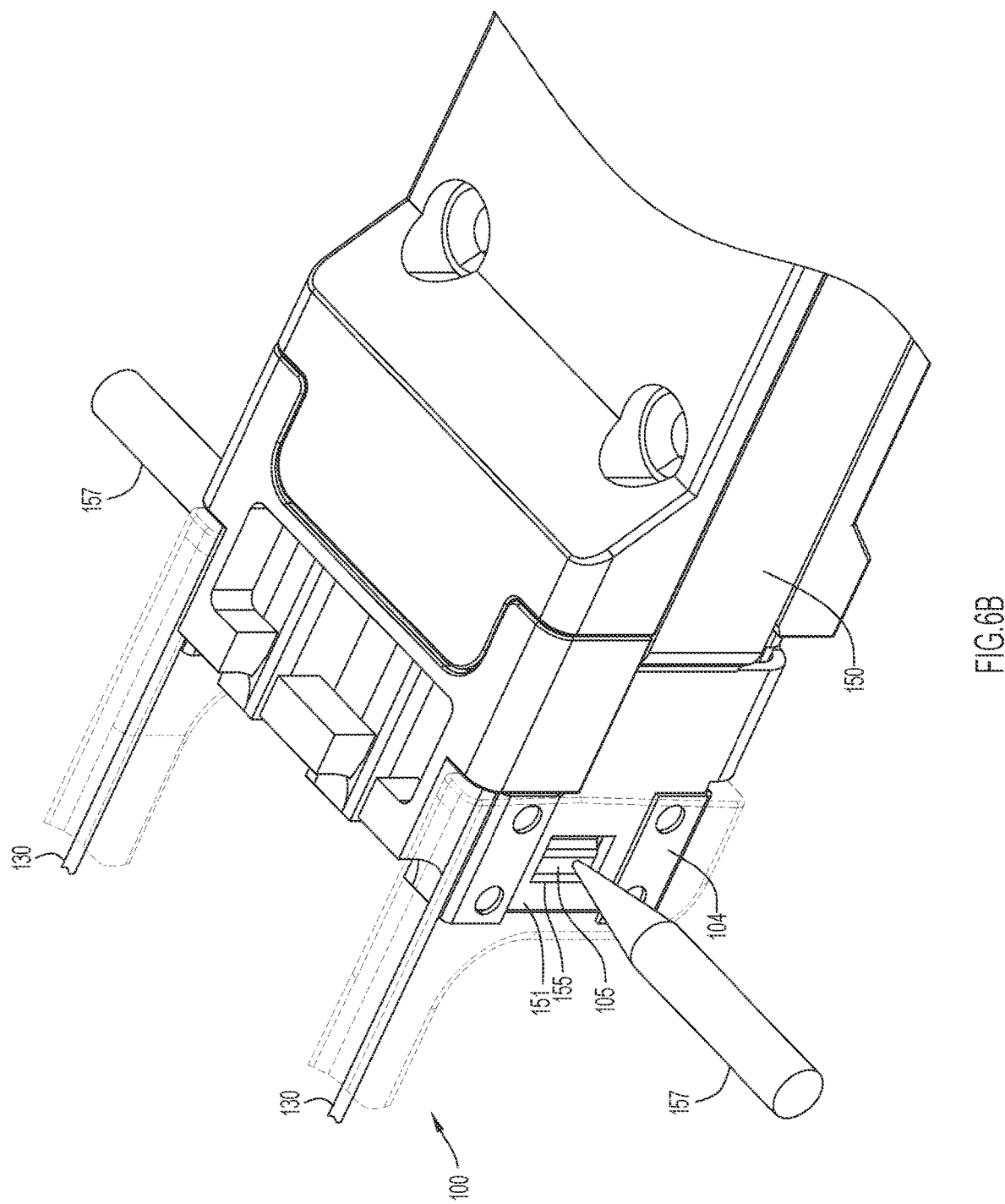
FIG. 6B is a diagram depicting removal of a pull tab with a removal tool, in accordance with another example embodiment.

FIG. 6B is a diagram depicting removal of a pull tab 100 with a removal tool 157, in accordance with another example embodiment. Again, for purposes of illustration, the body 110 of pull tab 100 is shown in FIG. 6A as being substantially transparent (opaque) so as to illustrate the details of attachment mechanisms 104 and the detachment from slides 150. More specifically, in the example of FIG. 6B, removal tool 157 is configured to apply a transverse force through the material of pull tab 100 in order to depress hook 105 so that hook 105 disengages from aperture 155. When a hook 105 is depressed in this manner, the corresponding slide arm 151 can move longitudinally relative to pull tab 100. As such, slide arm 151 may be removed from pull tab 100 (from opening 113) by applying a force to pull tab 100 that places attachment arms 102 in tension, thus pulling pull tab 100 away from transceiver module 125.

In some embodiments, removal tool 157 passes through (i.e. pierces) the material of pull tab 100 (e.g., in a destructive manner). In some embodiments, removal tool 157 non-destructively deforms the material of pull tab 100 as a force is applied to depress hook 105.

Figure 7A:
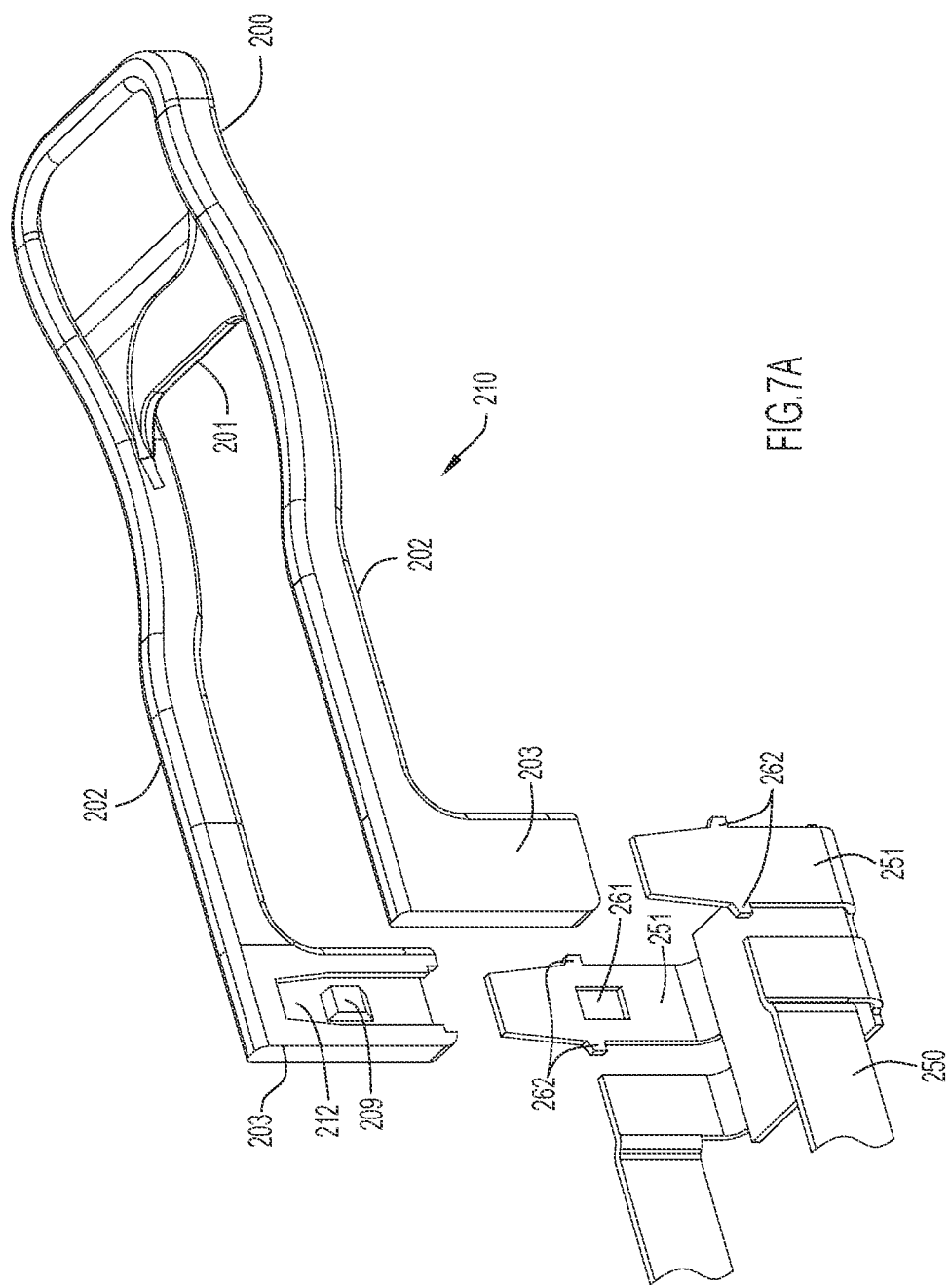
FIG. 7A is a diagram depicting an isometric view of a slide of a pluggable module and a pull tab, in accordance with an example embodiment.
Figure 7B:
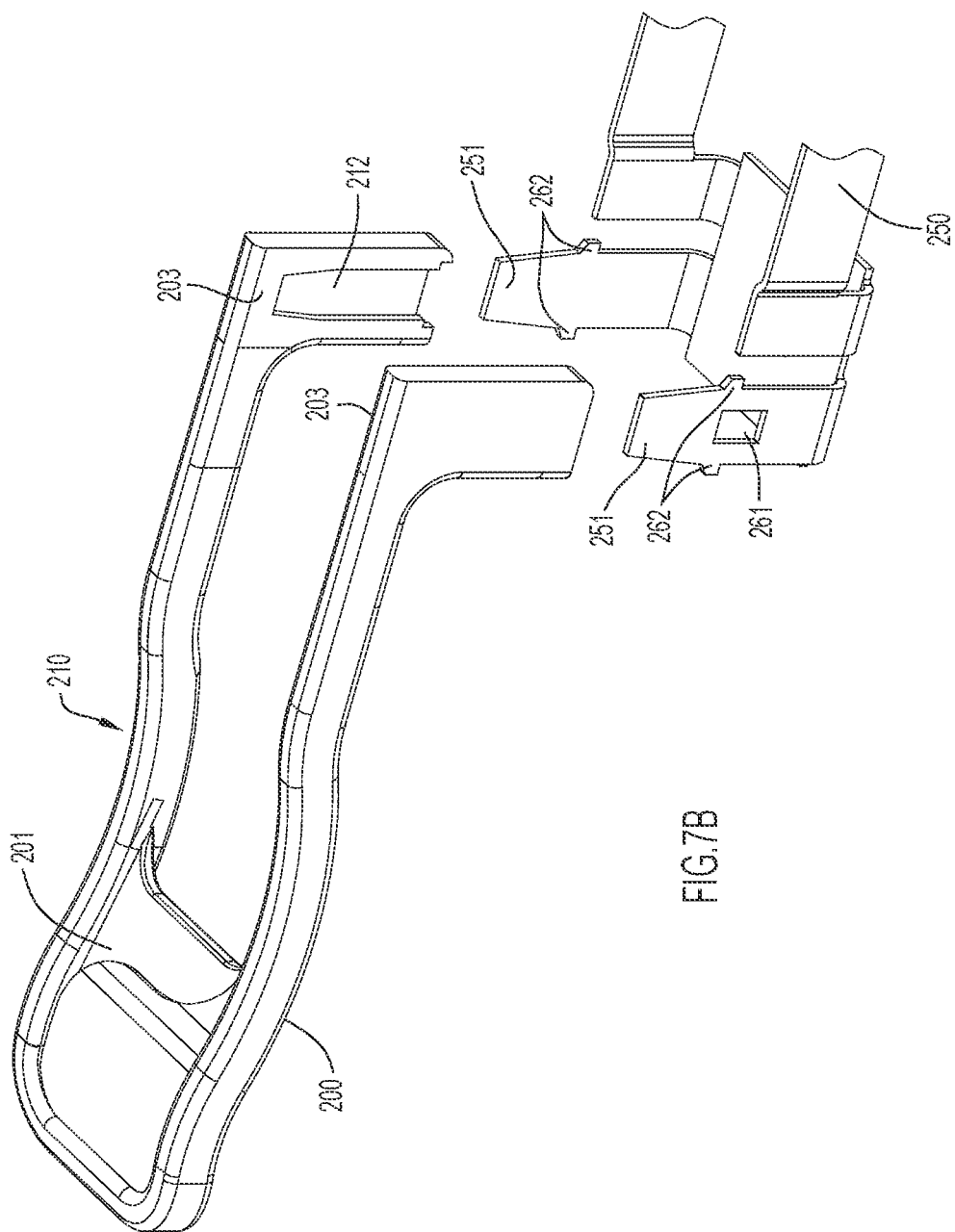
FIG. 7B is a diagram depicting an isometric view of a slide of a pluggable module and a pull tab, in accordance with an example embodiment.

FIGS. 7A and 7B are diagram depicting isometric views of a slide 250 of a transceiver module and a pull tab 200, in accordance with an example embodiment. As depicted, pull tab 200 is shown adjacent to, but detached from, the slide 250 and the corresponding transceiver module has been omitted. The transceiver module may be a module assembled from multiple components that is configured to perform one or more functions (e.g., conversion of light signals to electrical signals). When in use, the transceiver module may be positioned in a slot of a rack/cage.

As described in further detail below, pull tab 200 and slide 250 of the transceiver module are configured for detachable mechanical coupling/attachment with one another (e.g., physically mechanically connected to one another, or physically mechanically disconnected from one another, without the need to disassemble pull tab 200, slide 250, and/or the transceiver module 125).

As depicted in FIGS. 7A and 7B, pull tab 200 includes a handle 201 and two attachment arms 202 that include attachment (distal) ends 203. In certain embodiments, the handle 201 and attachment arms 202 (including attachment ends 203) of pull tab 200 collectively form a "body" 210 of the pull tab 200. The body 210 is generally formed from a resiliently flexible material (e.g., a material possessing a degree of flexibility). For example, the body such as a plastic material, thermoplastic vulcanizates (TPV) or other thermoplastic elastomer (TPE), a rubber material, and the like. In some embodiments, pull tab 200 includes a portion formed from Santoprene™. Santoprene™ is a trademark of Exxon Mobile.

As shown, each attachment end 203 includes a cavity 212 for attaching the attachment end 203 to slide arms 251 of slide 250. As described further below, each attachment arm 202, (including attachment ends 203) may be formed from a rigid or semi-rigid material and is configured for attachment to the transceiver module via slide 250. As shown in FIGS. 7A and 7B, the attachment ends 203 each include a cavity 212 that facilitates attachment of the attachment ends 203 to the slide arms 251 of slide 250, which in turn is attached to transceiver module 125 (for ease of illustration, the transceiver module is omitted from FIGS. 7A and 7B).

In the embodiment depicted in FIGS. 7A and 7B, slide 250 includes slide arms 251 configured to mate with cavities 212 inside of attachment (distal) ends 203 of pull tab 200. Cavities 212 may be open at the bottoms of attachment ends 203 to permit insertion of slide arms 251. An aperture 261 may be provided in one or more slide arms 251 through which a knob 209 of the interior surface of attachment end 203 may pass. Additionally or alternatively, barbs 262 may be provided on the sides of slide arms 251 that provide additional friction when in contact with the interior surface of cavities 212. In the depicted embodiment shows one attachment end 203 that includes knob 209 (and a corresponding slide arm 251 that includes aperture 261), and another attachment end 203 without a knob 209, it should be appreciated that in other embodiments, both attachment ends 203 may utilize the knob 209—aperture 261 locking mechanism or both attachment ends 203 may utilize the locking mechanism provided by barbs 262.

FIG. 8 is a diagram depicting an isometric view of slide 250 and pull tab 200 of FIGS. 7A and 7B, but with interior details shown, in accordance with an example embodiment. As depicted, when pull tab 200 is attached to slide 250, knob 209 may pass through aperture 261 and/or barbs 262 may penetrate into the interior material of one or more attachment ends 203 of pull tab 200. Pull tab 200 may be destructively removed from slide 250 in this example embodiment, e.g., via tearing of the material of attachment ends 203 of pull tab 200. In the embodiment shown, a reinforcement strip 230 having a distal end 232 is embedded in the body 210 of the pull tab 200. The reinforcement strip 230 extends from a first attachment end 203a through the attachment arms 202 and handle 201, to a second attachment end 203b. Each distal end 232 of the reinforcement strip 230 conforms to a portion of a perimeter of each cavity 212 distal to the handle 201.

In certain embodiments, the reinforcement strip 230 may be a wire, a strip, or a cable. In certain embodiments, the reinforcement strip 230 material may include a metal (e.g., steel, aluminum, brass, copper, etc.), a non-metallic material, and/or a polymer, e.g., Nylon, Kevlar, Nomex, Vectran, zylon, polypropylene, polyethylene, polyvinyl chloride, etc.) The size, shape, and material of the reinforcement strip 230 may be selected to avoid electromagnetic interference and conform to the material characteristics (e.g., flexibility) of the pull tab body 210.

In certain embodiments, the reinforcement strip 230 may include two reinforcement lines embedded in the pull tab 200. Each reinforcement line extending from an attachment end 203a, 203b to the handle 201. The two lines may be coupled to each other at the handle 201 or separated from one another by the material of the handle 201.

With additional reference to FIGS. 7A and 7B, in operation, a pulling force applied to the handle 201 to remove a transceiver module from a rack/cage is transmitted through the reinforcement strip 230 to distal ends 232 proximal to the cavities 212 and slide arms 251. Thus, a majority of the force applied to the handle 201 to remove the transceiver module from a rack/cage bypasses the body 210 and is transmitted through the reinforcement strip 230 to the one or more slide arms 251. Thus, the distal ends 232 of reinforcement strip 230 prevents detachment of the attachment ends 203a, 203b from the slide arms 251 by reinforcing the attachment ends 203a, 203b.

For example, force applied to the handle 201 is transmitted through the reinforcement strip 230 and the distal ends 232 of the reinforcement strip 230 to the one or more slide arms 251. Thus, a majority of the force applied to the handle 201 is transmitted through the reinforcement strip 230 and not solely through the attachment ends 203a, 203b. Accordingly, tearing of pull tab 200 near the cavities 212 may be avoided until the pull tab 200 is intentionally destructively removed from the one or more slide arms 251.

Figure 9A:
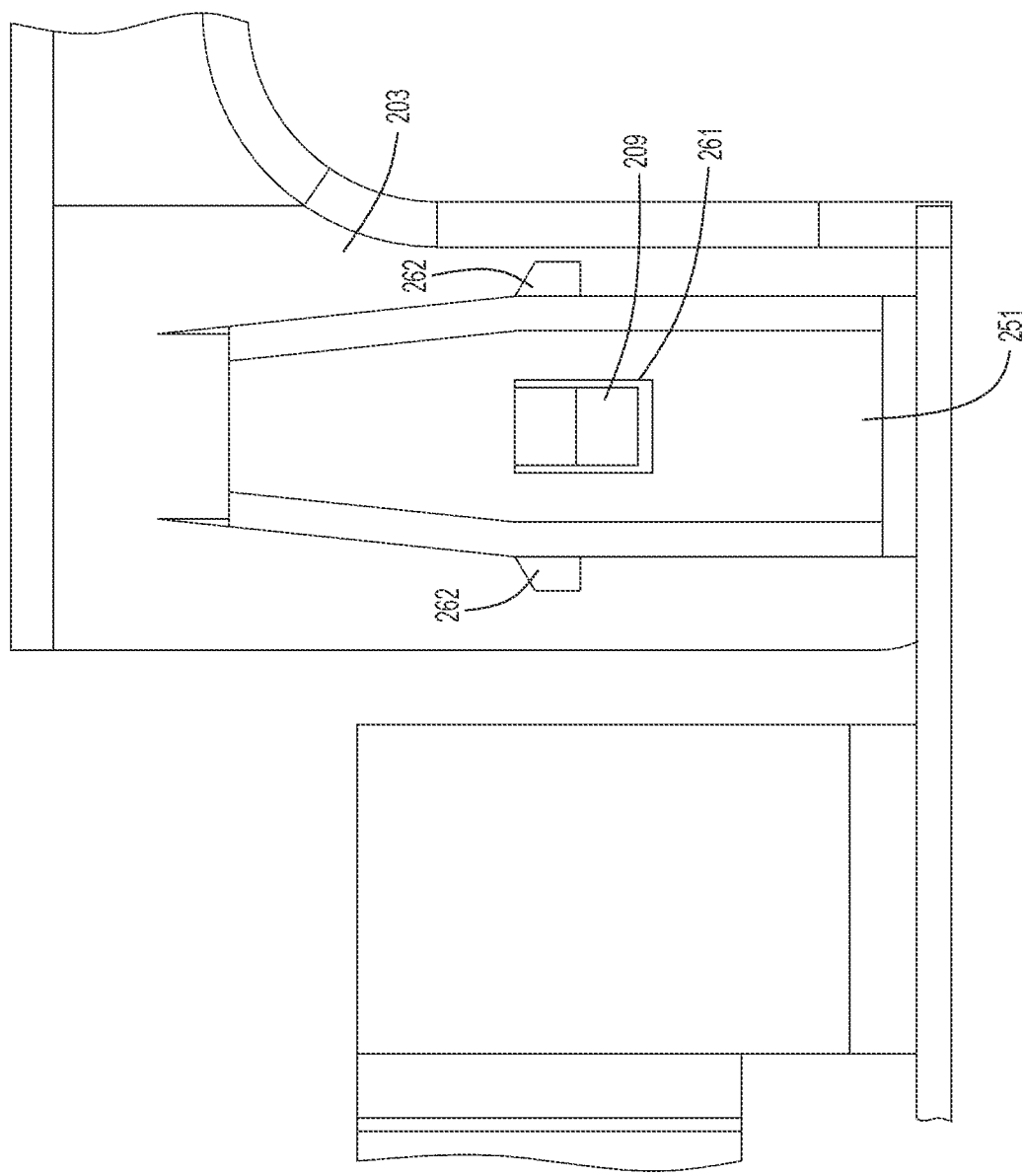
FIG. 9A is a diagram depicting a side view of a slide of a pluggable module and a pull tab, in accordance with an example embodiment.

FIG. 9A is a diagram depicting a side view of a slide 250 of a transceiver module and a pull tab 200, in accordance with an example embodiment. As depicted, when pull tab 200 is attached to slide 250, knob 209 passes through aperture 261 of slide arm 251 to couple the slide arms 251 to the attachment ends 203. Additionally or alternatively, barbs 262 may penetrate into the material of one or more attachment ends 203. In some embodiment, one or more attachment ends 203 include recesses that are configured to mate with barbs 262.

FIG. 9B is a diagram depicting a side view of a slide of a transceiver module transceiver and a pull tab, in accordance with an example embodiment. As depicted, slide arm 251 of slide 250 includes barbs 262 that penetrate into the material of attachment end 203.

Figure 10:
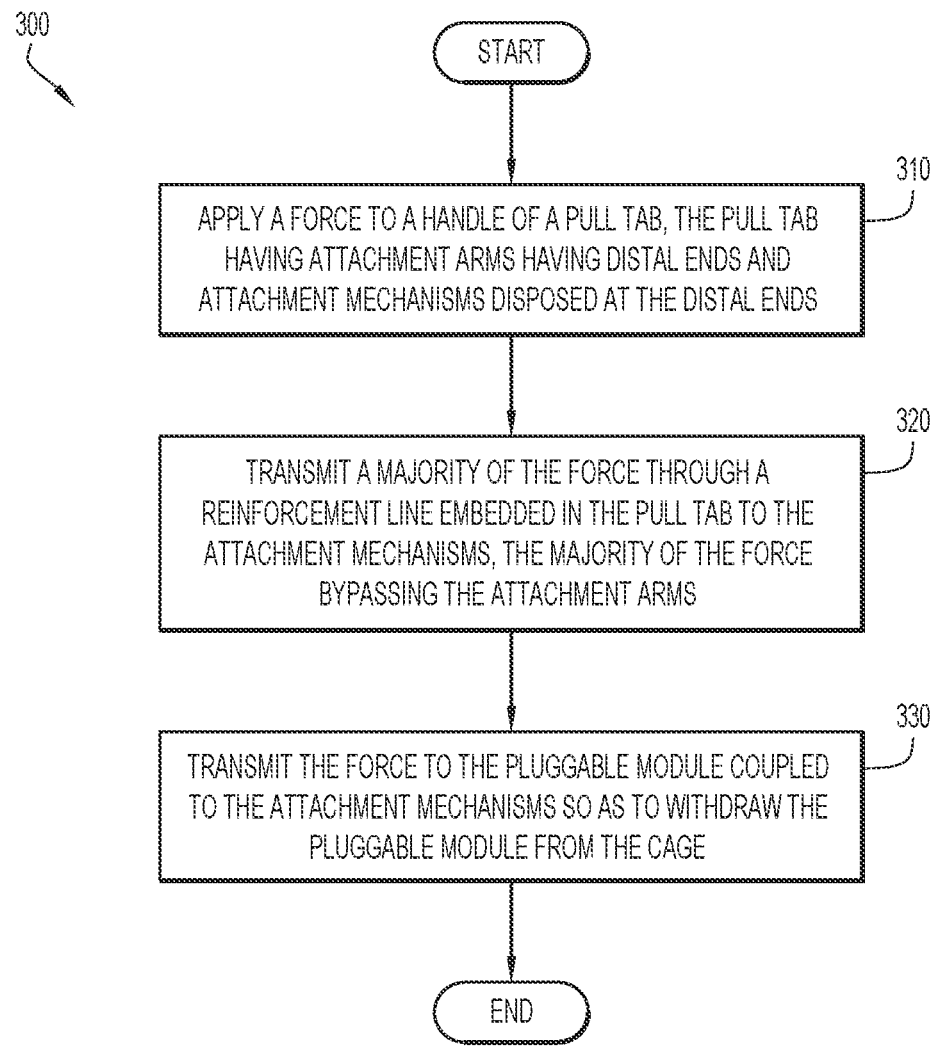
FIG. 10 is a flow chart depicting a method of removing a pluggable/transceiver module from a rack/cage, in accordance with an embodiment.

FIG. 10 is a flow chart depicting a method 300 of removing a pluggable/transceiver module 125 from a rack/cage, in accordance with an embodiment.

In operation 310, a force is applied to a pull tab 100 of transceiver module 125 received in a rack/cage. An assembly of pull tab 100 includes a handle 101, attachment arms 102 which terminate in attachment ends 103a, 103b which include attachment mechanisms 104. A reinforcement line 130 extends from the first attachment end 103a through first attachment arm 102a, the pull handle 101, and second attachment arm 102b to the second attachment end 103b. The reinforcement line 130 is coupled to the attachment mechanisms 104 and embedded in the pull tab body 110. Pull tab 100 may be detachably coupled to transceiver module 125 when hooks 105 of attachment mechanisms 104 are inserted into apertures 155 of slide 150.

In operation 320, a majority of the force is transmitted through the reinforcement line 130 embedded in the pull tab body 110 to the attachment mechanisms 104, bypassing the attachment arms 102a, 102b. For example, the force applied to the pull tab 100, may be applied at the handle 101, and a majority of the force may be transmitted to the reinforcement line 130 embedded in the pull tab body 110. The majority of force may be transmitted through reinforcement line 130 and a coupling between the reinforcement line 130 and attachment mechanism 104, to the attachment mechanisms 104. Thus, little or no force is transmitted through the attachment arms 102a, 102b.

In operation 330, the force is transmitted to the pluggable module 125 coupled to the attachment mechanisms 104 so as to withdraw the pluggable module 125 from the rack/cage. For example, the force transmitted to pluggable module 125 may overcome a friction force holding the pluggable module 125 in the cage/rack.

According to an example embodiment, a pull tab is provided. The pull tab includes a handle, a first attachment arm extending from the handle, a second attachment arm extending from the handle substantially parallel to the first attachment arm. A first attachment mechanism is disposed at a distal end of the first attachment arm, and a second attachment mechanism is disposed at a distal end of the second attachment arm. The first and second attachment mechanisms are configured to detachably couple to a corresponding first and second aperture, respectively, of a pluggable module. A reinforcement line is coupled to the first attachment mechanism and the second attachment mechanism. The reinforcement line is embedded in the handle, first attachment arm, and second attachment arm.

In one form, the first and second attachment mechanisms each comprise a hook that is configured to engage with the corresponding first and second apertures in a slide of the pluggable module to detachably couple the pull tab to the pluggable module. In another form, the pull tab is detached from the pluggable module by depressing the hooks of the first and second attachment mechanisms to disengage the hooks from the corresponding first and second apertures In one form, the reinforcement line is configured to transmit a pulling force received at the handle directly to the first and second attachment mechanisms.

In one form, the first attachment arm and the second attachment arm are comprised of a flexible material.

In one form, the reinforcement line extends from the first attachment mechanism through the first attachment arm, the handle, and the second attachment arm to the second attachment mechanism.

In one form, the reinforcement line, the first attachment mechanism and the second attachment mechanism are coupled via one of: an interference fit, solder, a weld, or an adhesive.

In another form, the first and second attachment mechanisms each include one or more openings, wherein a portion of the first attachment arm passes through the one or more openings of the first attachment mechanism and wherein a portion of the second attachment arm passes through the one or more openings of the second attachment mechanism.

In another form, the reinforcement line is composed of one of: a metallic or non-metallic wire, a cord, or a strip.

According to another example embodiment, a method of removing a pluggable module from a cage is provided. The method includes applying a force to a handle of a pull tab, the pull tab having attachment arms having distal ends and attachment mechanisms disposed at the distal ends. The method further includes transmitting a majority of the force through a reinforcement line embedded in the pull tab to the attachment mechanisms, the majority of the force bypassing the attachment arms, and transmitting the force to the pluggable module coupled to the attachment mechanisms so as to withdraw the pluggable module from the cage.

In another form, the reinforcement line is coupled to the attachment mechanisms via an interference fit, solder, a weld, or an adhesive.

In one form, the attachment arms include a first attachment arm and a second attachment arm. The attachment mechanisms include a first attachment mechanism disposed in the first attachment arm and a second attachment mechanism disposed in the second attachment arm. The reinforcement line extends from the first attachment mechanism through the first attachment arm, the handle, and the second attachment arm to a second attachment mechanism.

In another form, the reinforcement line is composed of one of: a metallic or non-metallic wire, a cord, or a strip.

In yet another example embodiment, a pull tab is provided. The pull tab includes a handle, a first attachment arm extending from the handle, a second attachment arm extending from the handle substantially parallel to the first attachment arm, a first cavity disposed at a distal end of the first attachment arm, a second cavity disposed at a distal end of the second attachment arm, and a reinforcement strip having a first distal end that conforms to the first cavity and a second distal end that conforms to the second cavity. The first cavity and the second cavity are adapted to mate with a first slide arm and a second slide arm, respectively, of a slide of a pluggable module, and the pull tab is attachable to the pluggable module by inserting the first slide arm into the first cavity and inserting the second slide arm into the second cavity.

In another form, the reinforcement strip is configured to transmit a pulling force received at the handle to the first slide arm when inserted in the first cavity and to the second slide arm when inserted in the second cavity. In another form, the first attachment arm and the second attachment arm are comprised of a flexible material, the flexible material is penetrable by one or more barbs of the first slide arm and the second slide arm that penetrate into the flexible material when the first cavity and the second cavity are mated with the first slide arm and second slide arm.

In another form, the reinforcement strip is embedded in the pull tab, and extends from the distal end of the first attachment arm, through the first attachment arm, the handle, and second attachment arm to a the distal end of the second attachment arm.

In another form, the reinforcement strip is made a metallic or non-metallic material.

In another form, the pull tab further includes a knob disposed in each of the first cavity and the second cavity, wherein each knob is configured to mate with a corresponding first and second aperture, respectively, of the first slide arm and a second slide arm.

In another form, the first and second cavities and distal ends of the reinforcement strip are disposed in a corresponding pair of extensions extending substantially orthogonal from the distal ends of the first and second attachment arms.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A pull tab comprising:
   a handle;
   a first attachment arm extending from the handle, the first attachment arm comprising a distal end configured to couple to a pluggable module; and
   a reinforcement line configured to be detachably coupled to the pluggable module, the reinforcement line at least partially embedded in the handle and the first attachment arm, the reinforcement line terminating adjacent to the distal end of the first attachment arm.

2. The pull tab of claim 1, further comprising a second attachment arm extending from the handle substantially parallel to the first attachment arm.

3. The pull tab of claim 2, wherein the reinforcement line is at least partially embedded in the second attachment arm.

4. The pull tab of claim 1, further comprising a first attachment mechanism disposed at the distal end of the first attachment arm.

5. The pull tab of claim 4, wherein the first attachment mechanism comprises a first hook that is configured to engage with a first aperture in a first slide of the pluggable module.

6. The pull tab of claim 5, further comprising:
a second attachment arm extending from the handle substantially parallel to the first attachment arm; and
a second attachment mechanism disposed at a distal end of the second attachment arm;
wherein the second attachment mechanism comprises a second hook that is configured to engage with a second aperture in a second slide of the pluggable module.

7. The pull tab of claim 6, wherein the reinforcement line is coupled to the first attachment mechanism and the second attachment mechanism.

8. The pull tab of claim 1, wherein the reinforcement line terminates within the handle.

9. The pull tab of claim 1, wherein the first attachment arm is configured to couple to an end of the pluggable module, and the handle of the pull tab faces the end while the first attachment arm is coupled to the end.

10. The pull tab of claim 1, wherein the reinforcement line is composed of one of: a wire, a cord, or a strip.

11. A method of removing a pluggable module from a cage, the method comprising:
applying a force to a handle of a pull tab, the pull tab having a first attachment arm having a distal end coupled to the pluggable module;
transmitting a majority of the force through a reinforcement line at least partially embedded in the pull tab to the pluggable module, the majority of the force bypassing the first attachment arm; and
transmitting the force to the pluggable module coupled to the distal end so as to withdraw the pluggable module from the cage.

12. The method of claim 11, wherein transmitting the force to the pluggable module comprises:
transmitting the force to a first attachment mechanism in the distal end of the first attachment arm, the first attachment mechanism coupled to the pluggable module.

13. The method of claim 12, wherein transmitting the majority of the force through the reinforcement line at least partially embedded in the pull tab to the pluggable module further comprises bypassing a second attachment arm of the pull tab.

14. The method of claim 13, wherein transmitting the force to the pluggable module comprises:
transmitting the force to a second attachment mechanism in a distal end of the second attachment arm, the second attachment mechanism coupled to the pluggable module.

15. A pull tab comprising:
a handle;
a first attachment arm extending from the handle;
a first attachment mechanism disposed at a distal end of the first attachment arm, wherein the first attachment mechanism is configured to couple to a pluggable module; and
a reinforcement line extending from the first attachment mechanism to the handle.

16. The pull tab of claim 15, wherein the reinforcement line is configured to transmit a pulling force received at the handle to the first attachment mechanism.

17. The pull tab of claim 15, wherein the first attachment mechanism is configured to detachably couple the reinforcement line to the pluggable module.

18. The pull tab of claim 17, further comprising:
a second attachment arm extending from the handle substantially parallel to the first attachment arm; and
a second attachment mechanism disposed at a distal end of the second attachment arm.

19. The pull tab of claim 18, wherein the reinforcement line is at least partially embedded in the second attachment arm.

20. The pull tab of claim 18, wherein the second attachment mechanism is configured to detachably couple the reinforcement line to the pluggable module.

* * * * *